J. MELLINGER.
GRINDING-MILL.
No. 189,484. Patented April 10, 1877.
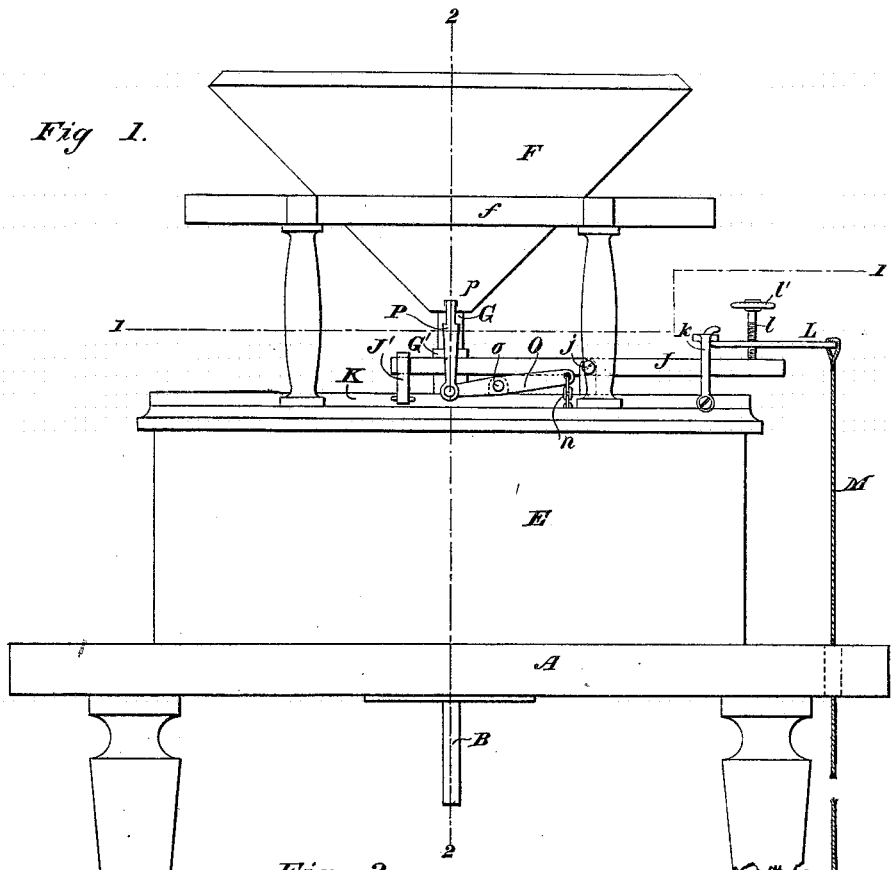
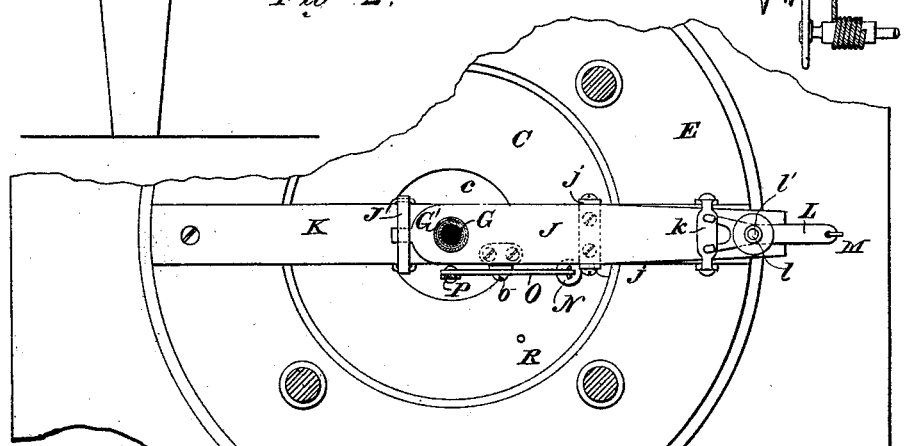

2 Sheets—Sheet 2.

J. MELLINGER.
GRINDING-MILL.

No. 189,484. Patented April 10, 1877.

WITNESSES

INVENTOR
John Mellinger.
By his Attorneys,
Baldwin, Hopkins & Peyton.

UNITED STATES PATENT OFFICE.

JOHN MELLINGER, OF GRANTSVILLE, MARYLAND.

IMPROVEMENT IN GRINDING-MILLS.

Specification forming part of Letters Patent No. 189,484, dated April 10, 1877; application filed October 25, 1876.

*To all whom it may concern:*

Be it known that I, JOHN MELLINGER, of Grantsville, in the county of Garrett and State of Maryland, have invented certain new and useful Improvements in Grinding-Mills, of which the following is a specification:

My improvements relate to mills of the class having a "silent feed." The objects of my invention are to insure the proper delivery of the grain to the stones in regulated quantities; to avoid impediment to the free passage of the grain through the eye of the runner; to provide simple devices for regulating the feed; to control from different floors of the building the supply of grain to the stones; and, automatically, to sound an alarm when the supply of grain in the hopper which feeds the stone shall be about to become exhausted.

To these ends my improvements consist in certain novel constructions of devices and combinations of parts hereinafter specifically designated.

In the accompanying drawings all my improvements are shown as embodied in a silent-feed mill, in which the upper stone is the runner; obviously, however, some of the improvements may be used without the others.

Figure 3:
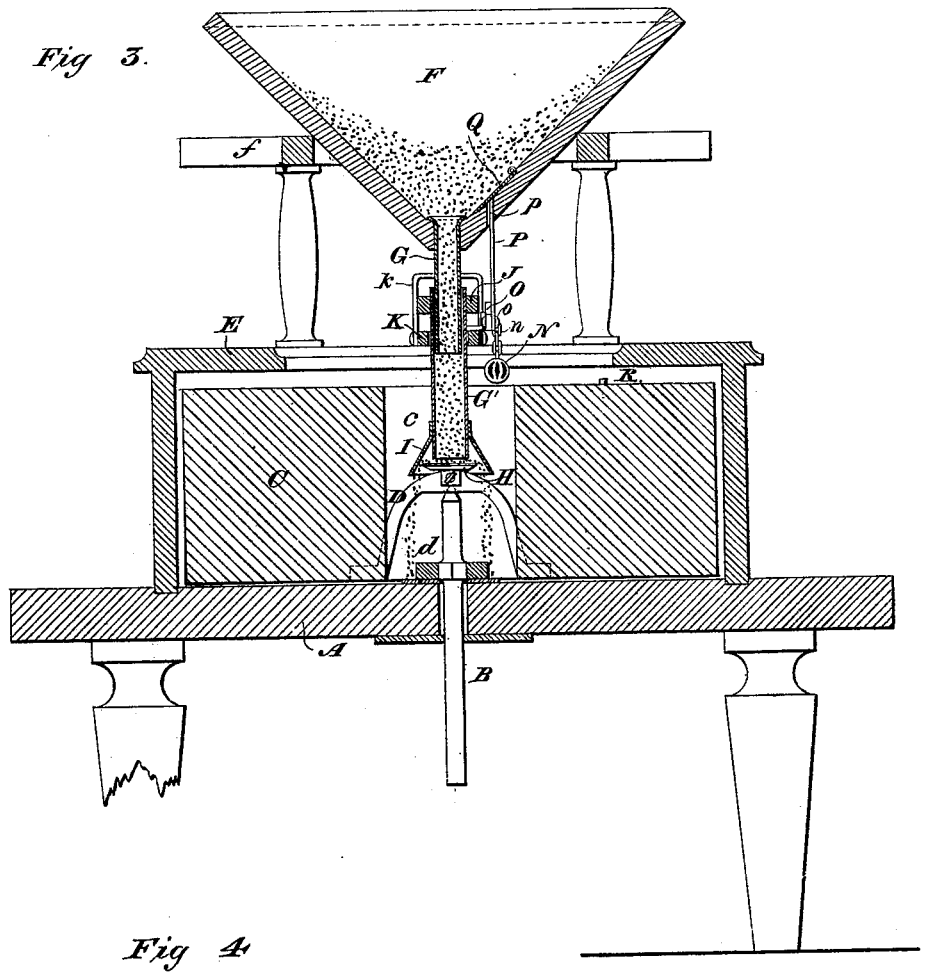
Figure 4:
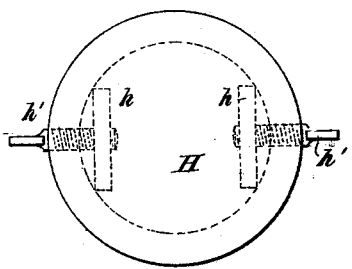
Figure 5:
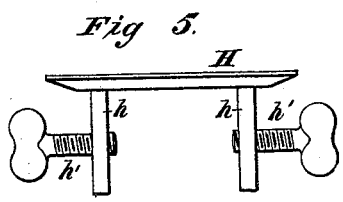

Figure 1 represents a view in elevation; Fig. 2, a section on the line 1 1 of Fig. 1, showing a plan view of the hoop or casing, the feed regulating device, &c.; Fig. 3, a vertical central section through the mill on the line 2 2 of Fig. 1. Fig. 4 is a plan view, on an enlarged scale, of the distributing-valve on the balance-rynd, detached; and Fig. 5, an elevation of the same.

Upon a suitable supporting-frame or "husk" the run of stones is mounted in any well-known way. The stationary, lower, or bed-stone A is represented in the drawings by the top of the supporting-frame. The spindle B, which is supported at its lower end in any suitable well-known way, passes, as usual, through a suitable bush in the lower stone A, and supports the runner or revolving upper stone C, by means of the balance-rynd D mounted in the eye $c$ of the runner, as is well understood. The motion of the spindle is conveyed to the runner by a driver, $d$, as usual. Above the hoop or casing E, for the run of stones, a hopper, or grain-supply trough or box, F, is supported by a frame, $f$, or otherwise. The grain passes from the hopper to the eye of the runner through a sectional supply-tube, by means of which the amount of grain fed to the stones may be regulated, as will presently be explained. The upper section G of the feed-tube, which is by preference made of glass or other transparent material, to enable the attendant to observe the flow of the grain and notice any impediment to the feed, is secured at its top in the opening in the bottom of the hopper, so as not to move therein. At its lower end it projects into the upper end of the lower section $G'$ of the supply-tube. The length of the sectional supply-tube may thus be increased or diminished by sliding one section upon the other, and its lower end caused to move toward or away from the rynd or arched bar D, by which the runner is poised on the driving-spindle. A valve-disk or plate, H, is secured upon the rynd D and revolves therewith. The grain, as it falls from the tube, strikes upon this valve, and is thrown off sidewise by its revolution.

To prevent the grain impinging upon the walls or sides of the eye of the runner, and, consequently, avoid the irregularity in the feed, and tendency to clog caused by the grain being held against the sides of the eye of the runner by centrifugal force, instead of falling to the bed-stone, I provide a deflector or guide, I, of an inverted-funnel shape upon the lower end of the supply-tube. The grain is thrown by the revolving valve H against the inner sides of this deflector, which, as shown in Fig. 3, projects below the valve and surrounds it, so as to intercept the grain on all sides and prevent it from striking against the walls of the eye of the runner. The valve H is constructed, as shown in detail in Figs. 4 and 5, of a flat-disk shape, and is provided with lugs or short downward projections $h\ h$, through which set-screws $h'\ h'$ pass to clamp it on the balance-rynd, as shown in Fig. 3. By this construction the valve is adapted for attachment to rynds of different thicknesses, and may be properly adjusted centrally beneath the feed-tube.

To regulate the feed the lower end of the supply-tube is moved away from or toward the valve H, according to whether it is desired to increase or diminish the amount of grain delivered to the stones within a given time. It is obvious that when the tube is lowered until its end abuts against the valve the flow of grain will cease entirely, and that it may be raised a considerable distance without elevating the lower edge of the deflector or flaring guide I above the valve-disk H, which raising would interfere with the proper action of the deflector. It will be seen that, as the distance between the lower end of the supply-tube and the valve is increased or diminished, the space between the guide and edges of the valve is likewise increased or diminished, and clogging avoided. The up-and-down movement of the lower section G' of the supply-tube is effected by means of a lever, J, rocking vertically upon a pivot, $j$, upon a suitable support on a cross-bar, K, which bar is secured at its ends upon the top of the casing E. The lower section of the tube moves endwise in an opening in the cross-piece, and is connected in suitable manner with the lever J, near its inner end, so as to be moved up and down thereby. A spring, J', connects the inner end of the lever with the cross-bar K, and has a tendency always to draw the lever down. The lever, near its outer end, moves in a yoke, $k$, secured to the cross-bar. An arm, L, is pivoted to the top of this yoke at one end, and projects out beyond the end of the lever at its other end. A long set-screw or screw-bolt, $l$, passes through a screw-tap or female screw in this arm, and bears at its lower end upon the lever. A head, $l'$, upon the bolt $l$, serves to turn it. To the outer end of the arm L one end of a rope, cord, chain, or strap, M, is secured, its other end being carried down to the floor of the building at which the meal is discharged, and adjustably secured to a windlass, cleat, or other fastening. This cord M is drawn sufficiently taut to hold the outer end of the arm L against upward movement, in which direction the pressure of the lever tends to force it. Thus, when the regulating-screw $l$ is operated to depress the outer end of the lever J, and raise its inner end, and with it the movable lower section of the supply-tube, the arm retains its position, as it also does if the tube is lowered by manipulating the screw-bolt. By carrying the end of the cord M to or near the point at which the meal is discharged from the spout the attendant is enabled to regulate the feed by drawing upon or slackening the rope, and securing it at its lower end.

To give warning when the supply of grain is exhausted, or is about to become so, I cause a globular alarm bell or rattle automatically to come in contact with and roll or wabble upon the upper surface of the runner when the hopper is empty or nearly so, and, by thus agitating the bell by the motion of the stone, sound an alarm to enable the miller to supply the hopper afresh or stop the revolution of the runner, and thus prevent the injury to the stones which would result from their continuing to run when not supplied with grain. An ordinary sleigh-bell, N, is suspended by means of a link, chain, or other flexible connection, $n$, from one end of a lever, O, pivoted at $o$ to the cross-bar K, so as to be capable of rocking vertically. The opposite end of this lever is pin-jointed to a rod or arm, P, passing upward through, and capable of endwise movement in an opening $p$, in the hopper bottom. This rod P bears upon a hinged plate or flap valve, Q, secured upon the inside of the hopper. (See Fig. 3.) As long as the pressure or weight of the grain upon the valve is sufficient to keep it shut or close upon the bottom or side of the hopper, (which is the case until nearly all the grain has run out,) the bell N is kept up above the surface of the runner; but when the weight of the outer and longer end of the lever O, the bell, and its connection with the lever, overcomes the weight of the arm P and the pressure upon the valve Q, and thus allows the bell to drop and touch the upper surface of the runner, an alarm is immediately sounded. If desired, one or more projections, R, may be provided upon the surface of the runner to strike against the bell and shake it, so as to insure its sounding an alarm; but I have found that when an ordinary perforated globular bell, such as is usually known as a sleigh-bell, is employed, that simply the contact of the bell with the stone, when in rapid motion, is sufficient to sound an alarm. Instead of having the outer end of the lever O long, as shown, it is obvious that it might be made considerably shorter and weighted.

Usual well-known means are employed for adjusting the stones toward or away from each other, as desired, and all the essentials of a complete mill are, of course, to be provided.

Instead of a sectional feed-tube, having a telescopic joint, a single tube, extending up into the hopper, and working endwise therein, may be employed, though I prefer the construction shown. Instead of the valve attached to the inside of the hopper, a valve might be carried on top of the arm P, and answer the same purpose.

I claim as of my invention—

1. The combination of the adjustable feed-tube, the vertically-rocking lever, supported on the cross-bar and connected with the feed-tube, the spring connecting the inner end of the lever with the cross-bar, the yoke secured to the cross-bar, the arm pivoted to the yoke above and extending beyond the outer end of the lever, the screw passing through the arm and bearing upon the lever, and the cord secured to said arm, these members being constructed, arranged, and operating substantially as hereinbefore set forth, whereby the feed may be regulated by the screw or by the cord, either of which may be, at any time, adjusted from its respective floor to rock the adjusting-lever without interfering with the operation of the other to increase or diminish the feed.

2. The combination, substantially as hereinbefore set forth, with a valve in the hopper, controlled by the weight of the grain, and the runner, of a globular alarm-bell connected with the valve, and operated by direct contact with the runner, upon which it rolls when the hopper is empty, or nearly so.

3. The combination of the runner, the cross-bar, the bell-lever pivoted to the bar, the bell flexibly suspended from the outer end of the lever, the rod pivoted to the inner end of said lever, and the valve in the hopper, against which the rod bears, these members being constructed and operating substantially as hereinbefore set forth.

In testimony whereof I have hereunto subscribed my name.

JOHN MELLINGER.

Witnesses:
    B. WELFLEY,
    A. G. KEIM.